(12) United States Patent
Sridharan et al.

(10) Patent No.: US 11,792,786 B2
(45) Date of Patent: Oct. 17, 2023

(54) UPLINK CHANNEL REPETITIONS THAT CROSS SLOT BOUNDARIES

(71) Applicant: QUALCOMM Incorporated, San Diego, CA (US)

(72) Inventors: Gokul Sridharan, Sunnyvale, CA (US); Seyedkianoush Hosseini, San Diego, CA (US); Hung Dinh Ly, San Diego, CA (US); Krishna Kiran Mukkavilli, San Diego, CA (US); Yi Huang, San Diego, CA (US); Hwan Joon Kwon, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 17/484,913

(22) Filed: Sep. 24, 2021

(65) Prior Publication Data
US 2022/0104227 A1    Mar. 31, 2022

Related U.S. Application Data

(60) Provisional application No. 63/084,861, filed on Sep. 29, 2020.

(51) Int. Cl.
*H04W 72/1268*  (2023.01)
*H04W 72/23*  (2023.01)

(52) U.S. Cl.
CPC ....... *H04W 72/1268* (2013.01); *H04W 72/23* (2023.01)

(58) Field of Classification Search
CPC .......................... H04W 72/23; H04W 72/1268
USPC .......................................................... 370/329
See application file for complete search history.

(56) References Cited

U.S. PATENT DOCUMENTS

2022/0104219 A1\*   3/2022   Sridharan ......... H04W 72/1263

\* cited by examiner

*Primary Examiner* — Peter G Solinsky
(74) *Attorney, Agent, or Firm* — Patterson + Sheridan, L.L.P./Qualcomm

(57) ABSTRACT

Aspects of the present disclosure relate to wireless communications, and more particularly, to maintain phase coherence for repetitions of uplink channel transmissions across slot boundaries. One example method includes receiving, from a network entity, phase coherence configuration information indicating that the UE is to maintain phase coherence for repetitions of uplink channel transmissions that cross slot boundaries; receiving scheduling information scheduling a plurality of repetitions of an uplink channel transmission; determining, based on the scheduling information, that the scheduled plurality of repetitions of the uplink channel transmission will cross one or more slot boundaries; and transmitting the plurality of repetitions of the uplink channel transmission based on the scheduling information and the phase coherence configuration information.

30 Claims, 12 Drawing Sheets

UPLINK CHANNEL REPETITIONS THAT CROSS SLOT BOUNDARIES

CROSS-REFERENCE TO RELATED APPLICATIONS

This application claims benefit to U.S. Provisional Patent Application Ser. No. 63/084,861, entitled "Uplink Channel Repetitions That Cross Slot Boundaries," filed Sep. 29, 2020, and assigned to the assignee hereof, the contents of which are hereby incorporated by reference in its entirety.

TECHNICAL FIELD

Aspects of the present disclosure relate to wireless communications, and more particularly, to uplink channel repetitions that cross slot boundaries such that phase coherence is maintained across slot boundaries.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving, from a network entity, phase coherence configuration information indicating that the UE is to maintain phase coherence for repetitions of uplink channel transmissions that cross slot boundaries, receiving scheduling information scheduling a plurality of repetitions of an uplink channel transmission, and transmitting the plurality of repetitions of the uplink channel transmission based on the scheduling information indicating that the scheduled plurality of repetitions of the uplink channel transmission will cross one or more slot boundaries and the phase coherence information.

One innovative aspect of the subject matter described in this disclosure can be implemented in a method for wireless communication by a network entity. The method generally includes transmitting, to a user equipment (UE), phase coherence information indicating that the UE is to maintain phase coherence for repetitions of uplink channel transmissions that cross slot boundaries, transmitting scheduling information scheduling a plurality of repetitions of an uplink channel transmission, and receiving the plurality of repetitions of the uplink channel transmission based on the scheduling information and the phase coherence configuration information.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to performing repetitions of uplink channel transmissions across slot boundaries such that phase coherence is maintained across slot boundaries.

The following description provides examples of performing repetitions of uplink channel transmissions across slot boundaries such that phase coherence is maintained across slot boundaries, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
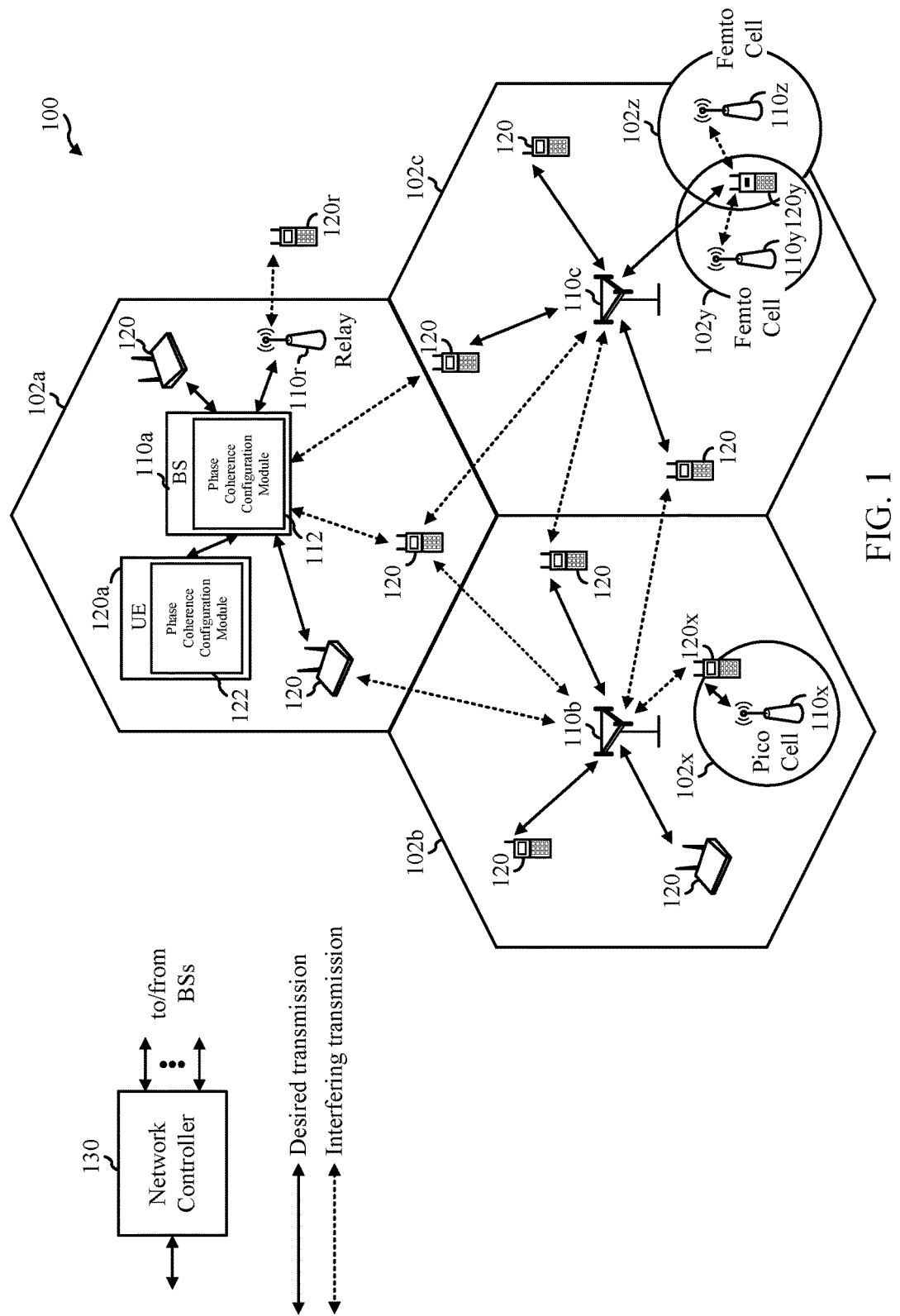
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a phase coherence configuration module 122 that may be configured to perform (or cause UE 120a to perform) operations 500 of FIG. 5. Similarly, a BS 110a may include a phase coherence configuration module 112 that may be configured to perform (or cause BS 110a to perform) operations 600 of FIG. 6.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
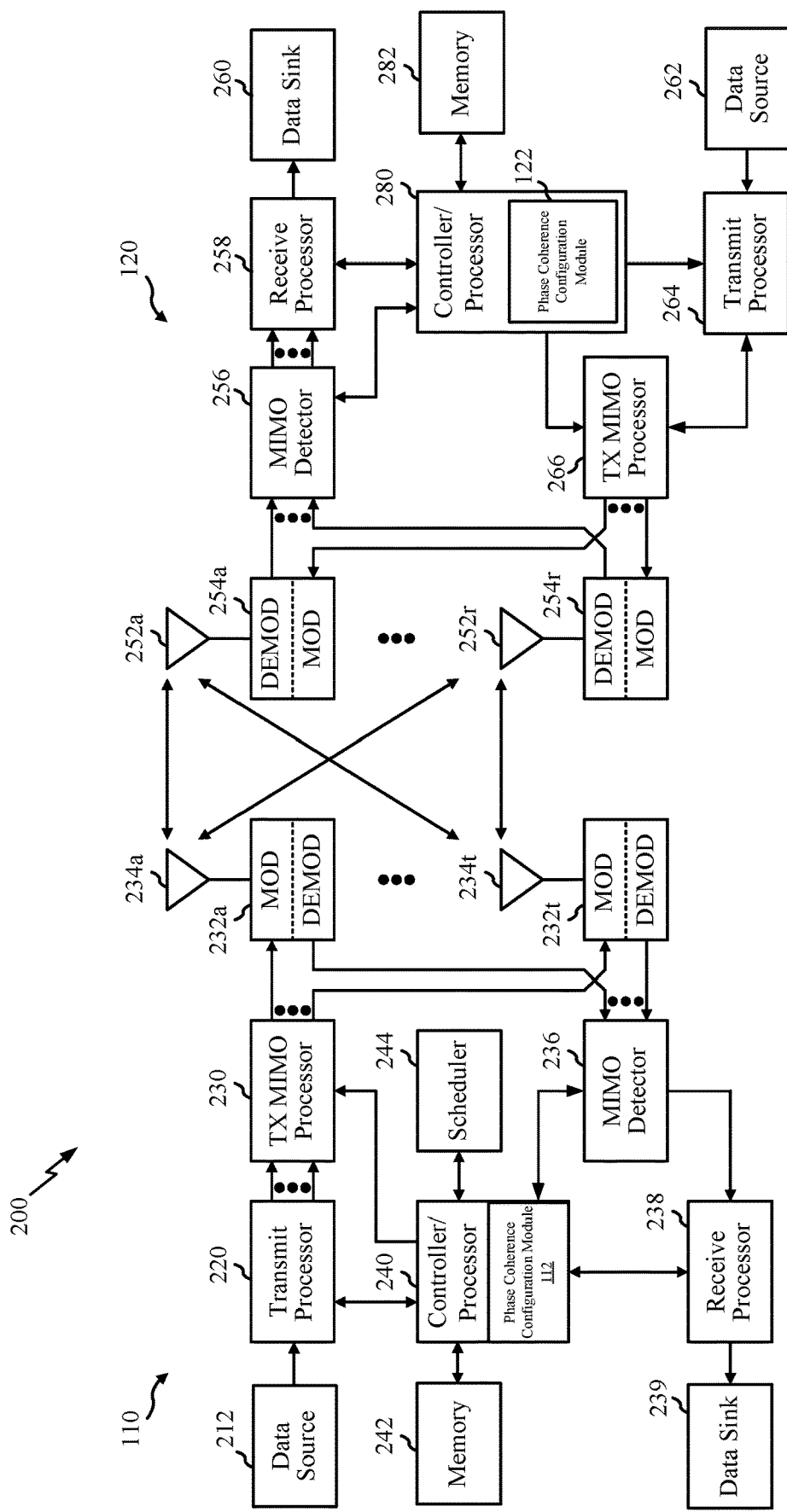
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a phase coherence configuration module 122 that may be configured to perform (or cause UE 120 to perform) operations 500 of FIG. 5. Similarly, the BS 120a may include a phase coherence configuration module 112 that may be configured to perform (or cause BS 110a to perform) operations 600 of FIG. 6.

Figure 3A:
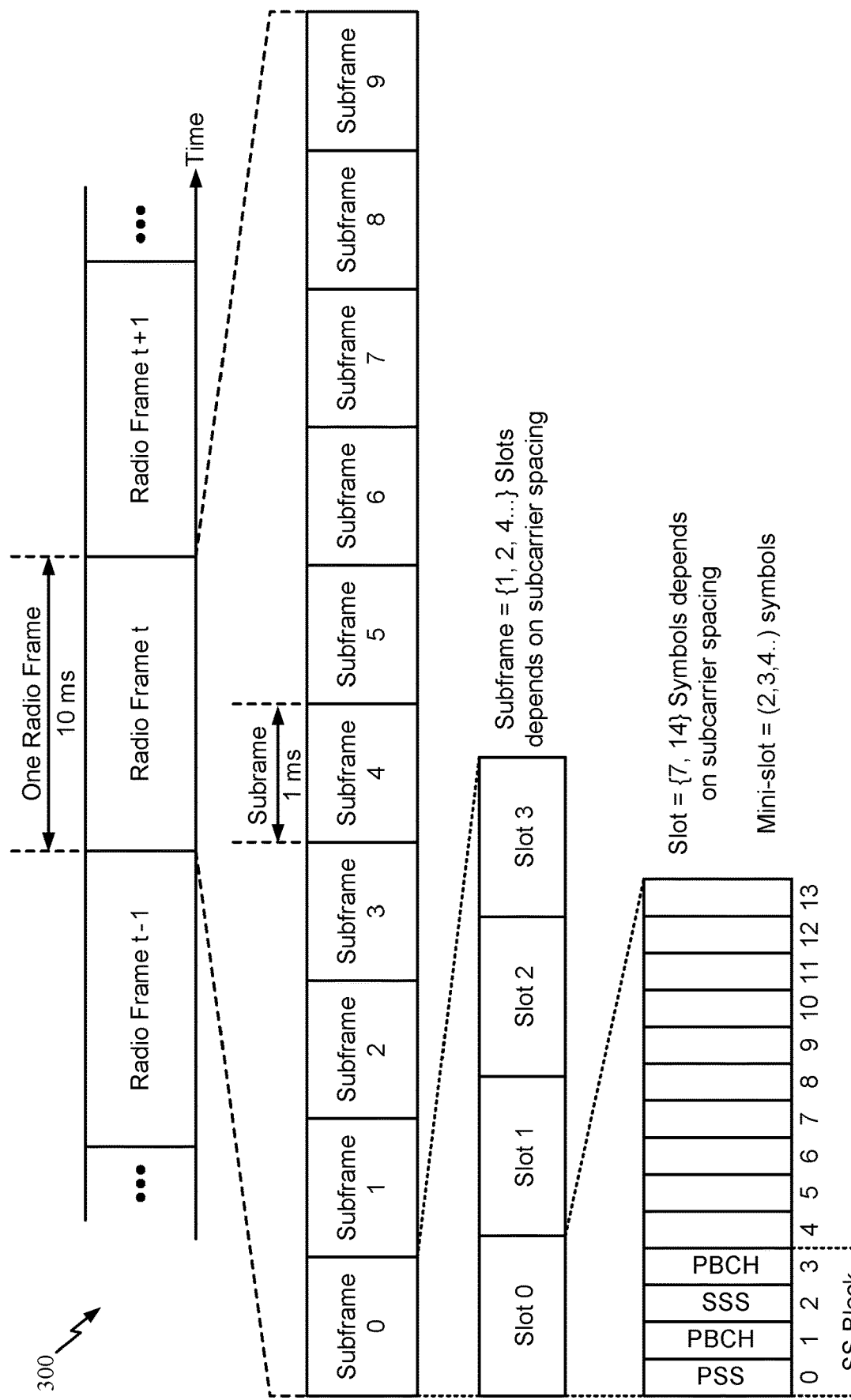
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
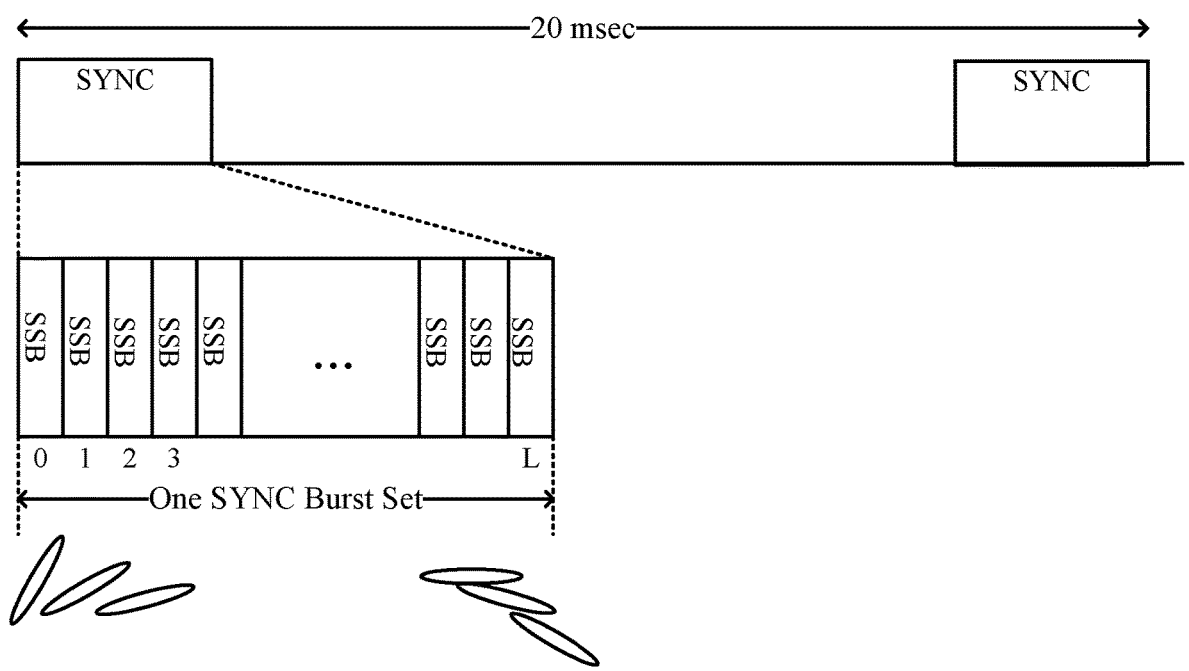
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

In NR, a wake up signal (WUS) is defined which is monitored by the UE outside the Active Time. The WUS may be detected with relatively simple receiver components, allowing the UE to stay in a reduced power state. The WUS indicates whether the UE should wake up (more fully) for PDCCH monitoring.

Example Uplink Channel Repetitions that Cross Slot Boundaries

Aspects of the present disclosure relate to wireless communications, and more particularly, to performing repetitions of uplink channel transmissions across slot boundaries such that phase coherence is maintained across slot boundaries. As will be described in greater detail below, RS monitoring occasions may be configured periodically and/or aperiodically such that idle or inactive mode UEs can perform tracking updates and/or receiving paging from a network entity.

To allow for repetition of uplink channel transmissions, various rules may be defined so that a device can derive actual repetitions of an uplink channel repetition from nominal information (e.g., information identifying a starting system, a length of each repetition, and a number of repetitions). Generally, repetitions may be rate matched to allow for an increase in code rate. However, to ensure that uplink channel repetitions do not cross a slot boundary, some repetitions may be truncated, and thus, a loss in coding gain may be experienced. In these cases, repetitions may not cross slot boundaries, as slot boundaries may be defined a priori as locations at which phase coherence need not be maintained. For example, a UE may, at a slot boundary, change transmission power, a timing advance value, perform various radio frequency configuration changes that may not be known to a network entity, or perform other changes to the parameters used for communicating with the network entity such that phase coherence may not be maintained across slot boundaries.

Figure 4:
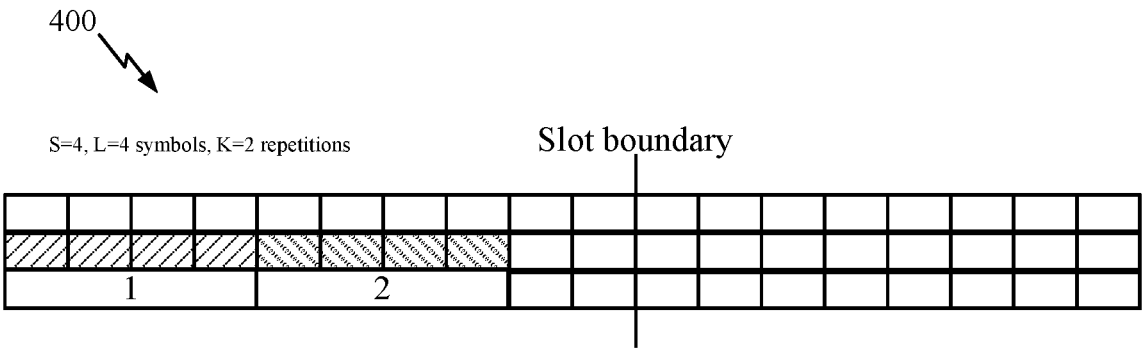
FIG. 4 illustrates examples of uplink channel repetitions that cross slot boundaries.
Figure 4:
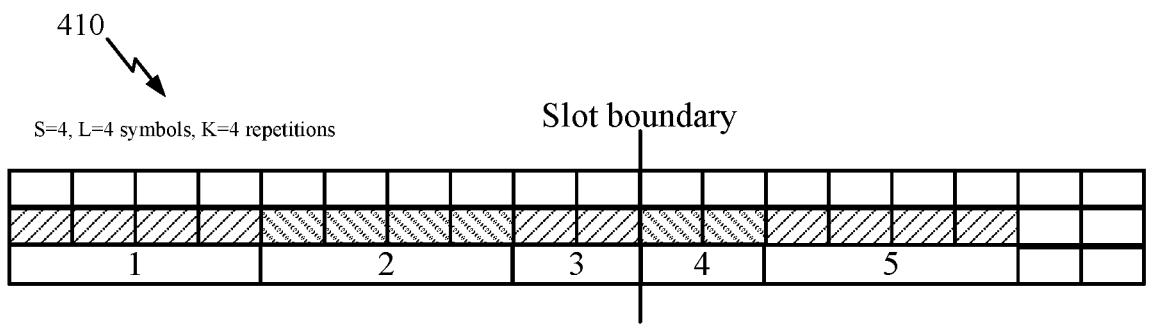
Figure 4:
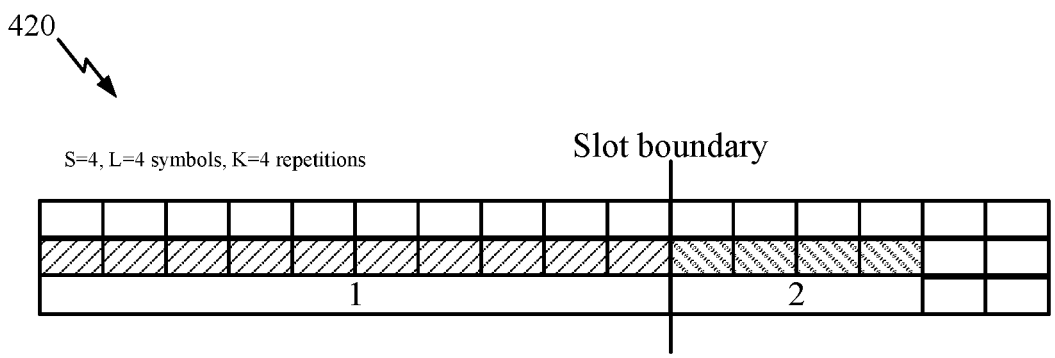

FIG. 4 illustrates examples of uplink channel repetitions based on nominal information. Generally, a transport block size may be determined for a first transmission and applied to subsequent transmissions, excepting those that cross a slot boundary. Generally, uplink channel repetitions may be defined in terms of a starting symbol S, a length L, and a number of repetitions K. A number of slots spanned by a transmission may be given by the equation:

$$\text{ceiling}\left(\frac{L*K+S}{numSymbolsInASlot}\right),$$

where the ceiling( ) function rounds the value of to $$\frac{L*K+S}{numSymbolsInASlot}$$

the next higher integer.

Uplink channel repetition 400 illustrates a scenario in which repetitions do not cross a slot boundary. In this example, starting symbol S is symbol 4, L is set to 4 symbols, and K is set to 2 repetitions. In a slot having 14 symbols, the first repetition may be transmitted on symbols 5-8, and the second repetition may be transmitted on symbol 9-12, leaving two remaining symbols before a slot boundary (or slot border) is encountered.

Uplink channel repetition 410 illustrates a scenario in which repetitions cross a slot boundary. In this example, the starting symbol S is set to symbol 4, L is set to 4 symbols, and K is set to 4 repetitions. In this case, S+(K*L) is greater than the number of symbols in a slot (e.g., 14 symbols). That is, S+(K*L)=4+(4*4)=20, which means that a repetition of the uplink transmission will cross a slot boundary at which phase coherence may not be maintained. In such a case, some of the repetitions can be truncated such that the symbols of any specific repetition of the uplink channel transmission are contained within a particular slot. For example, as illustrated, repetition 3 may be truncated to a length of two symbols, and similarly, repetition 4 may also be truncated to a length of two symbols.

Uplink channel repetition 420 illustrates a scenario in which a single repetition crosses a slot boundary. In this case, the starting symbol S is set to symbol 4, L is set to 14 symbols, and K is set to 1 repetition. Because S+L exceeds the number of symbols in a slot, a portion of the repetition may be transmitted across a slot boundary at which phase coherence may not be maintained. Thus, a portion of the symbols in uplink channel repetition 420 may be transmitted using different uplink transmission parameters from other symbols in uplink channel repetition 420.

Figure 5:
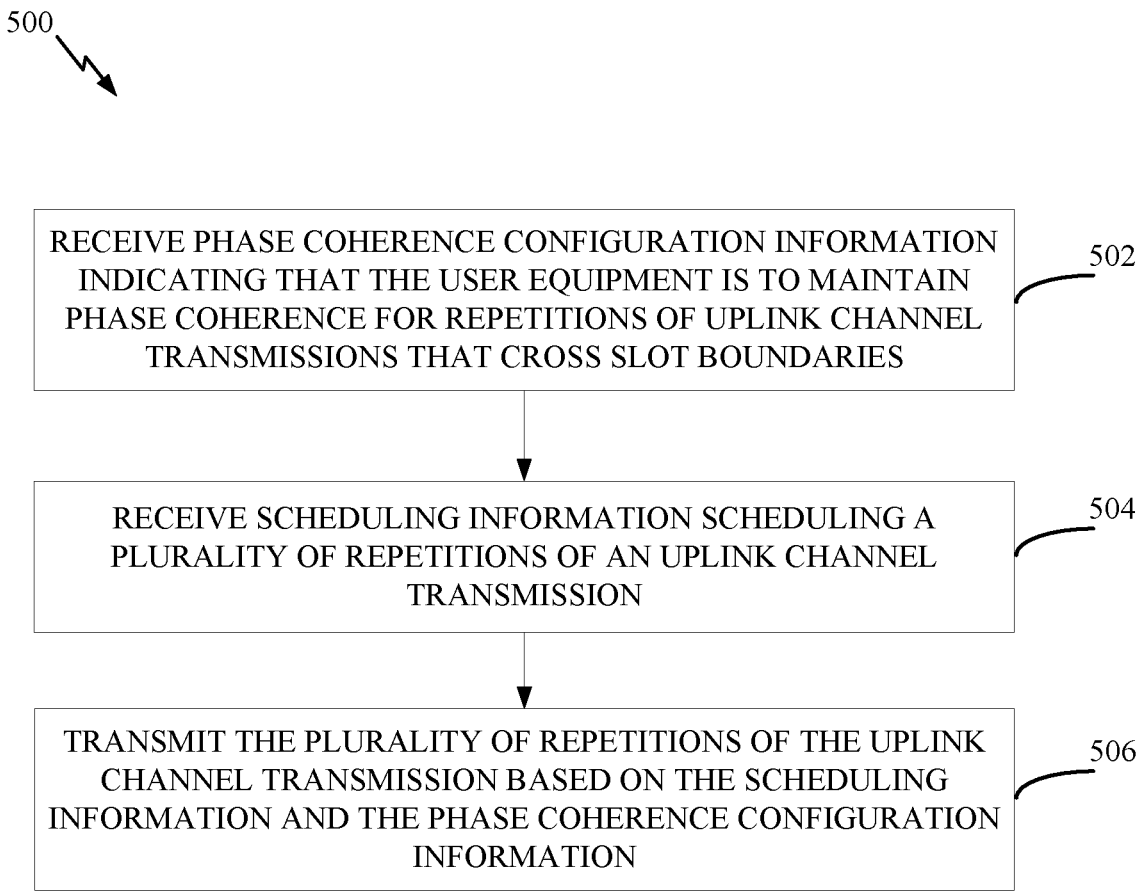
FIG. 5 illustrates example operations that may be performed by a user equipment (UE) to transmit uplink channel repetitions such that phase coherence is maintained across one or more slot boundaries, in accordance with certain aspects of the present disclosure.

FIG. 5 illustrates example operations 500 that may be performed by a user equipment (UE) to transmit uplink channel repetitions across slot boundaries such that phase coherence is maintained across slot boundaries, in accordance with aspects of the present disclosure. Operations 500 may be performed, for example, by a UE 120 illustrated in FIG. 1.

As illustrated, operations 500 may begin at block 502, where the UE receives phase coherence configuration information indicating that the user equipment is to maintain phase coherence for repetitions of uplink channel transmissions that cross slot boundaries.

At block 504, the UE receives scheduling information scheduling a plurality of repetitions of an uplink channel transmission. The scheduling information may include, for example, information indicating that the scheduled plurality of repetitions of the uplink channel transmission will cross one or more slot boundaries.

At block 506, the UE transmits the plurality of repetitions of the uplink channel transmission based on the scheduling information and the phase coherence configuration information. For example, the UE may transmit the plurality of repetitions of the uplink channel based on the indication, included in the scheduling information, that the scheduled plurality of repetitions of the uplink channel transmission will cross one or more slot boundaries. The phase coherence configuration information may, as discussed in further detail below, allow for the UE to maintain use of particular uplink channel transmission parameters across slot boundaries and allow for such parameters to change after a particular repetition in the plurality of repetitions or after transmission of the plurality of repetitions of the uplink channel transmission. As discussed in further detail herein, phase coherence may be maintained across one or more slot boundaries over which the scheduled plurality of repetitions may be transmitted. Phase coherence may be maintained throughout the scheduled plurality of repetitions or for a subset of the scheduled plurality of repetitions, based on various parameters defining how long phase coherence can be maintained, the number of repetitions for the uplink channel, and the like.

Figure 6:
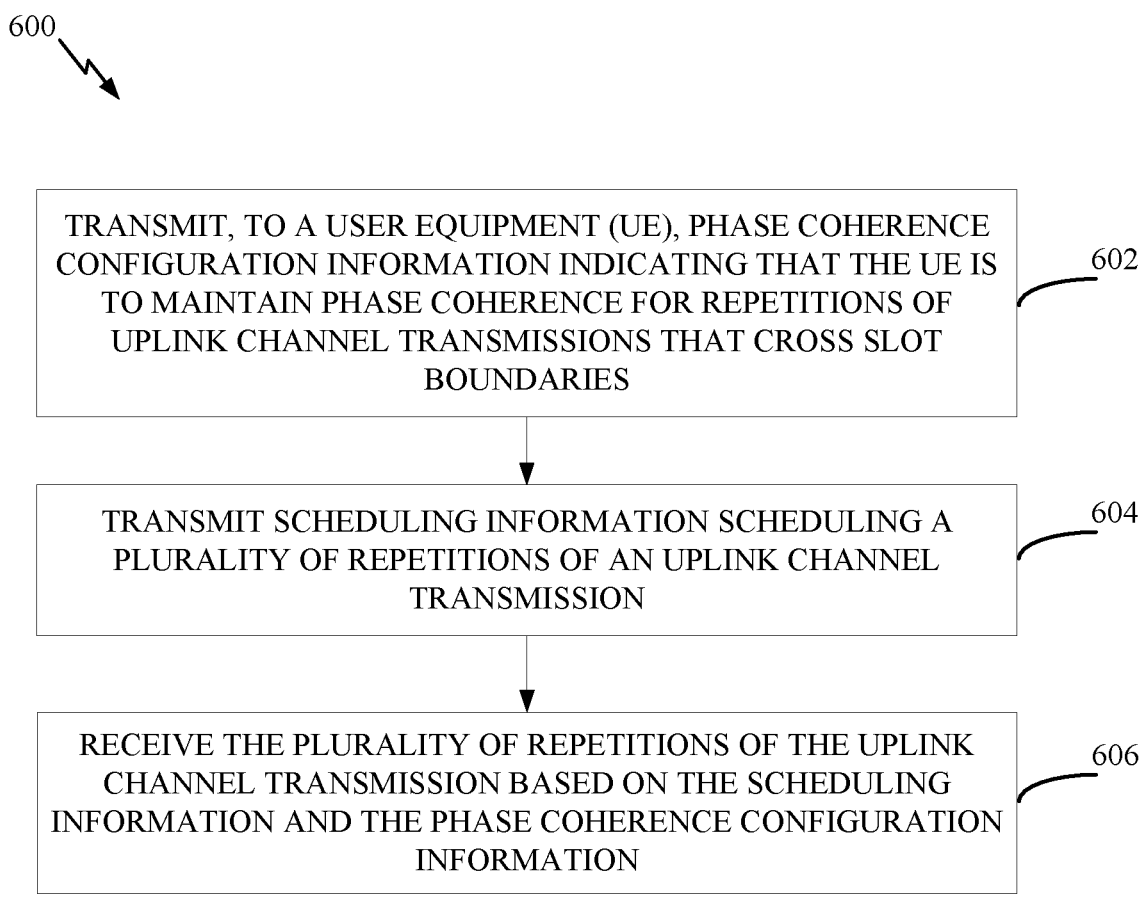
FIG. 6 illustrates example operations that may be performed by a network entity to configure a user equipment (UE) to transmit uplink channel repetitions such that phase coherence is maintained across one or more slot boundaries, in accordance with certain aspects of the present disclosure.

FIG. 6 illustrates example operations 600 that may be performed by a network entity, such as a gNodeB, to configure a UE to transmit uplink channel repetitions across slot boundaries such that phase coherence is maintained across slot boundaries, in accordance with aspects of the present disclosure. Operations 600 may be performed, for example, by a base station 110 illustrated in FIG. 1.

As illustrated, operations 600 may begin at block 602, where a network entity transmits, to a user equipment (UE), phase coherence configuration information indicating that the UE is to maintain phase coherence for repetitions of uplink channel transmissions that cross slot boundaries.

At block 604, the network entity transmits, to the UE, scheduling information scheduling a plurality of repetitions of the uplink channel transmission.

At block 606, the network entity receives the plurality of repetitions of the uplink channel transmission based on the scheduling information and the phase coherence configuration information.

Generally, as discussed above, uplink channel repetitions, such as repetitions of a physical uplink shared channel (PUSCH), in the absence of an indicator to the contrary, may be split across slot boundaries. Aspects of the present disclosure provide techniques to signal that uplink channel repetitions may cross slot boundaries and that phase coherence may be maintained across slot boundaries for at least some of these repetitions. For example, a slot bundling indicator for a particular type of uplink channel repetition (e.g., a slot bundling indicator for PUSCHRepTypeB) may be set to a first value to indicate that the network entity has requested that the UE maintain phase coherence across contiguous slots and to a second value to indicate that the UE need not maintain phase coherence across contiguous slots. The request that the UE maintain phase coherence may be received by the UE via one or more of downlink control information (DCI) signaling, a medium access control (MAC) control element (CE) (MAC-CE), or in radio resource control (RRC) signaling. A network entity may assume that the UE is able to comply with a request to maintain phase coherence across contiguous slots.

In some aspects, uplink repetitions may be scheduled via a dynamic grant (DG). The DG may be scheduled via DCI and may be scheduled on demand, and the DG may include, for example, a time domain resource allocation identifying time-domain resources on which an uplink transmission can be performed. For example, a DG PUSCH may schedule transmission of a PUSCH for a particular slot, and the TDRA information (e.g., slot and length indicator value (SLIV) and number of repetition information) may indicate that the grant will cross a slot boundary.

Figure 7:
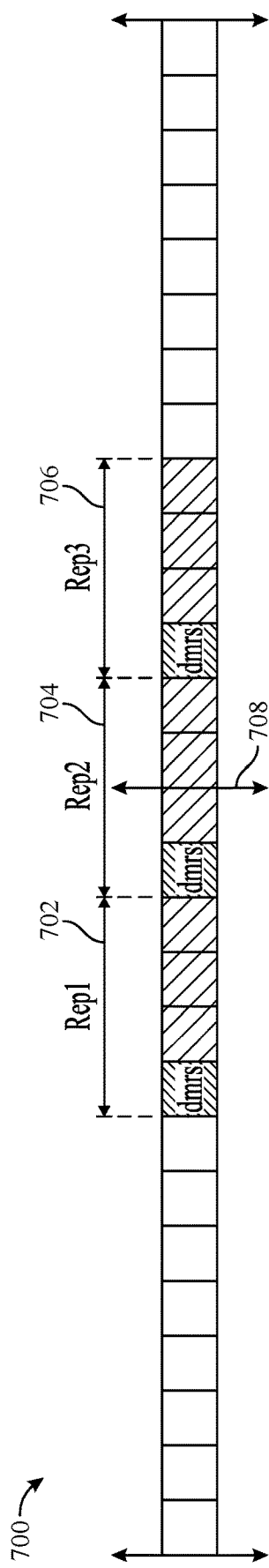
FIG. 7 illustrates repetitions of an uplink channel transmission that can cross slot boundaries, in accordance with certain aspects of the present disclosure.

FIG. 7 illustrates an example of a DG PUSCH transmission 700 in which repetitions 702, 704, 706 cross a slot boundary 708. The DG that schedules PUSCH transmission 700 may include an indication of whether repetitions may be split across the slot boundary 708 (as illustrated in FIG. 7). The indication may be, as discussed above, a slot bundling indicator, and where included in the DG, may be applicable to the uplink transmissions scheduled by that DG (and thus may not applicable to uplink transmissions scheduled by other grants). In some aspects, the indication of whether repetitions may be split across slot boundaries may be pre-set (e.g., in configuration information received via one of RRC signaling or a MAC-CE), which may statically apply the configuration to various repetitions of uplink channel transmissions. In DG PUSCH transmission 700, the DG may indicate that the scheduled repetitions can cross the slot boundary 708, and as discussed herein, phase coherence may be maintained for repetitions 702, 704, and 706 in the DG PUSCH transmission 700, despite repetition 704 crossing the slot boundary 708.

Figure 8:
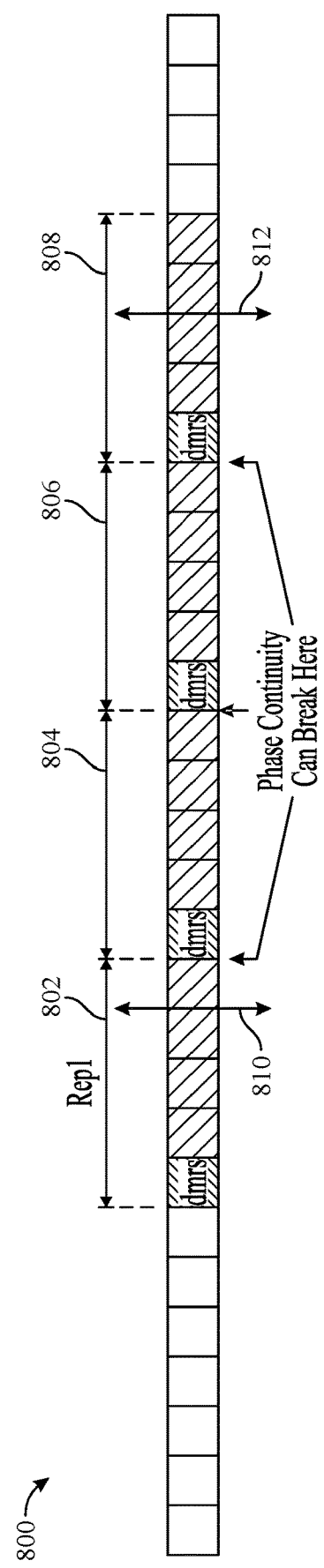
FIG. 8 illustrates points in time within a set of repetitions of an uplink channel transmission crossing slot boundaries at which phase continuity can be broken, in accordance with certain aspects of the present disclosure.

In some aspects, as illustrated in FIG. 8, a PUSCH transmission 800 may include a plurality of repetitions 802, 804, 806, 808 that cross a plurality of slot boundaries 810, 812. As illustrated, each repetition 802, 804, 806, 808 may cover 5 symbols, and the four repetitions of the uplink channel transmission may cross two slot boundaries 810 and 812. To allow for phase coherence to be maintained across a slot boundary, the UE may be configured to allow for a break in phase coherence between the end of one repetition and the beginning of another repetition. In one example, a first repetition that crosses a slot boundary (e.g., repetition 802 as illustrated in FIG. 8) may be transmitted in its entirety instead of being truncated at slot boundary 810. Phase coherence may be broken at a repetition boundary (e.g., the boundary between repetition 802 and repetition 804) instead of at a slot boundary. In another example, phase coherence may be broken at a repetition boundary before a slot boundary. For example, it can be seen in FIG. 8 that repetition 808 crosses a slot boundary. To maintain phase coherence across the slots bounded by slot boundary 812, phase coherence may be broken at the repetition boundary immediately prior to slot boundary 812. As with repetition 802, discussed above, repetition 808 can be transmitted in its entirety instead of being truncated at slot boundary 812.

The indication of whether phase coherence may be broken between or within different slots may, in some aspects, be carried in a bitmap that identifies whether phase coherence is desired between successive slots. For a number of slots n in which the repetition of the uplink channel transmission is carried, the bitmap may have a size of n−1. A first value for a bit i in the bitmap (e.g., value '1', Boolean TRUE, etc.) may indicate that phase coherence is to be maintained across the slots sharing the corresponding $i^{th}$ slot boundary, and a second value for bit i in the bitmap (e.g., value '0', Boolean FALSE, etc.) may indicate that phase coherence need not be maintained across the slots sharing the corresponding $i^{th}$ slot boundary.

In some aspects, the bitmap may include a number of bits, with each bit corresponding to a slot over which the plurality of repetitions are to be transmitted. That is, for a number of slots n in which the repetition of the uplink channel transmission is carried, the bitmap may also have a size of n. A first value for a bit i in the bitmap may indicate that the UE is to take no action to break phase coherence at the end of slot i, while a second value for bit i in the bitmap may indicate that phase coherence need not be maintained after the end of slot i.

In some aspects, the indication that phase coherence is desired between slot boundaries may be a DMRS bundling indicator (e.g., a bit that indicates whether PUSCH-DMRS bundling is activated). The DMRS bundling indicator may be used to enforce phase coherence across an entire slot. For repetitions that cross a slot boundary, phase coherence may be maintained across the symbols within a particular repetition and need not be maintained across different repetitions.

Figure 9:
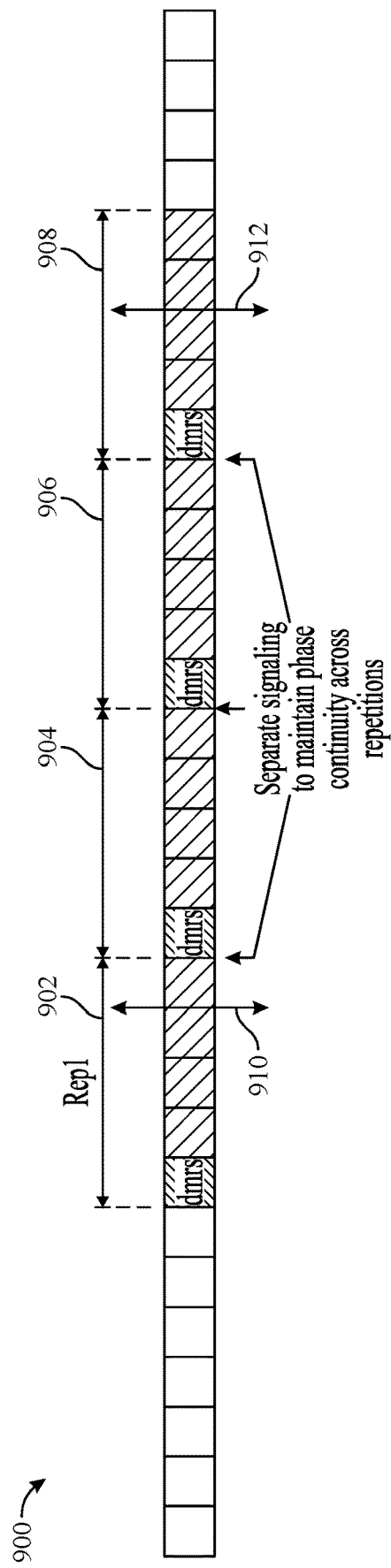
FIG. 9 illustrates points in time within a set of repetitions of an uplink channel transmission crossing slot boundaries at which phase continuity can be broken based on signaling for each repetition boundary, in accordance with certain aspects of the present disclosure.

FIG. 9 illustrates an example PUSCH transmission 900 in which phase coherence need not be maintained across repetitions. In this example, a plurality of repetitions 902, 904, 906, and 908 may be scheduled to cross slot boundaries 910 and 912. As illustrated, separate signaling may be used to indicate whether phase coherence is to be maintained across different repetitions (e.g., across successive repetitions). In this example, phase coherence may be maintained or broken at any repetition boundary between successive repetitions (e.g., at the boundary between repetitions 902 and 904, the boundary between repetitions 904 and 906, and/or the boundary between repetitions 906 and 908). Generally, inter-repetition bundling may be disabled if frequency hopping is enabled. Where inter-repetition bundling is enabled, signaling may be used to indicate whether inter-repetition phase coherence is to be maintained. The signaling may be, for example, a single bit indicating whether phase coherence is to be maintained across repetitions in the PUSCH transmission 900.

In some aspects, a bitmap need not be used to signal that phase coherence is to be maintained across slot boundaries. For a single transmission with 16 repetitions and a 14 symbol resource allocation, the length of a transmission may be 16 slots. The length of the transmission may be short enough that the granular control over cross-slot phase coherence provided by a bitmap may not be needed, and thus a less granular indication may be used.

In some aspects, a UE may be scheduled to perform various uplink transmissions at a slot boundary. For example, a UE may adjust its timing based on timing advance commands that are known to a serving base station. Transmission power changes may be performed at a slot boundary. Closed loop power control changes at a UE may be known at a base station, but open loop power control changes may not be known at the base station. Further, radio frequency configuration changes (e.g., due to temperature changes at a UE) may not be known to a base station. To preserve phase coherence, UE-driven operations may be postponed, and network entity-driven operations may be avoided while phase coherence is indicated to be maintained by the UE. For example, UE-driven operations may be postponed until after repetitions of the uplink channel are transmitted or until a boundary between different repetitions of the uplink channel transmission is encountered. In some aspects, a UE may indicate its ability to postpone UE-driven operations (and, correspondingly, its ability to maintain phase coherence) to the network entity. For example, in UE capability signaling transmitted to the network entity, the UE may indicate that phase coherence can be maintained for a maximum of K slots. The network entity can use the indication to adjust phase coherence requirements for a scheduled uplink transmission (e.g., by maintaining coherence for K consecutive slots where the number of slots over which repetitions of an uplink channel are transmitted exceeds K). In some aspects, where a single bit is used to indicate that the maintenance of phase coherence is desired, the UE may treat the indication as an indication that the UE is to maintain phase coherence as long as possible (i.e., up to K slots), and then fall back to legacy behavior (in which repetitions are truncated at a slot boundary) after transmission of repetitions of the uplink channel over K slots.

Figure 10:
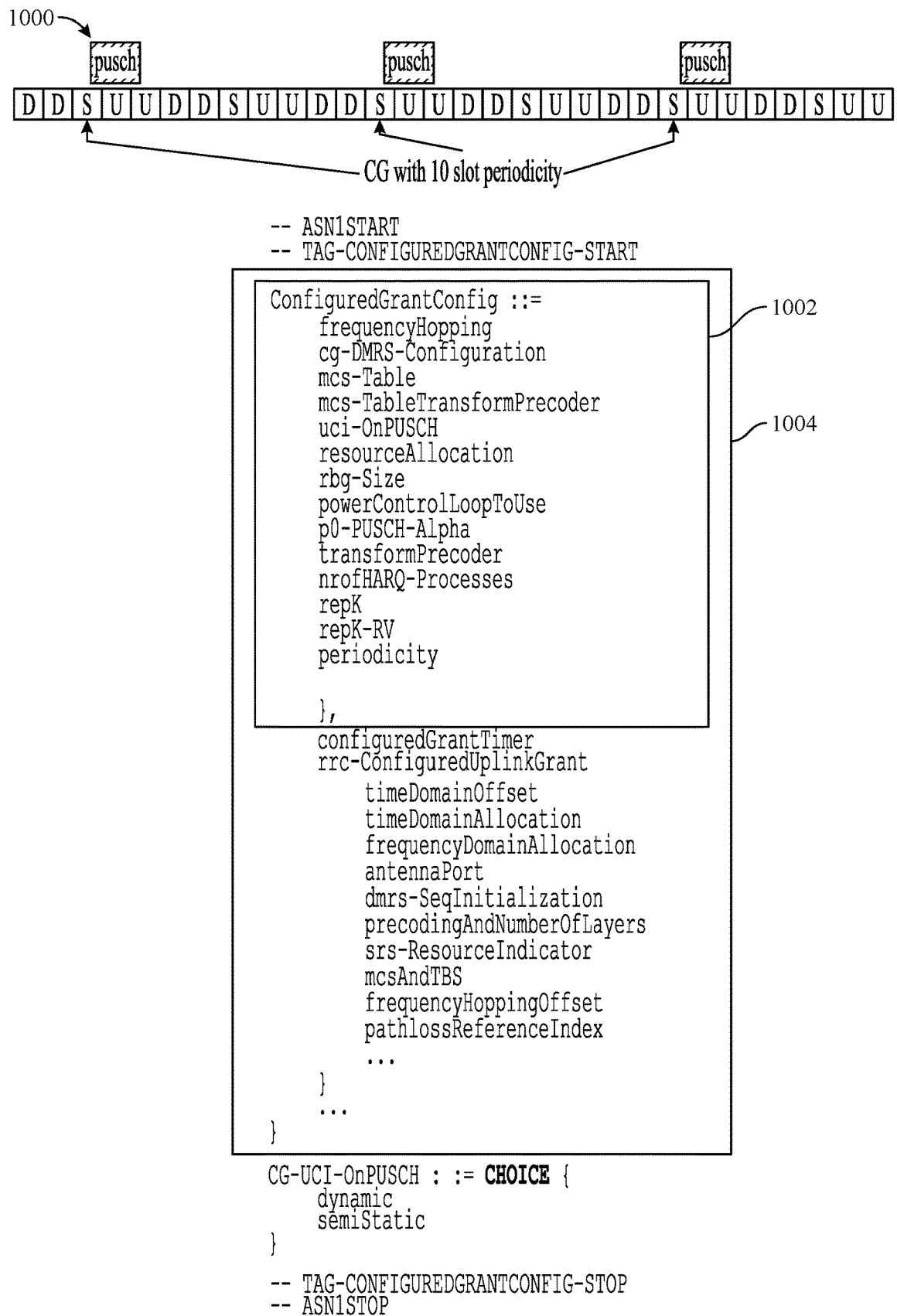
FIG. 10 illustrates a configured grant of uplink resources on which a repetition of an uplink channel transmission crossing slot boundaries may be performed, in accordance with certain aspects of the present disclosure.

In some aspects, repetitions of uplink channel transmissions may be scheduled via a configured grant (CG) that is setup via RRC signaling, as illustrated in FIG. 10. CG 1000, for example, illustrates a configured grant with a 10 slot periodicity in which a physical uplink shared channel (PUSCH) is transmitted. The CG may be a "Type 1" grant that is set up using RRC or a "Type 2" grant that is activated or deactivated via DCI.

Configuration 1002 illustrates information that may be included in a Type 1 CG. As illustrated, the configuration information for a Type 1 CG may include a time domain resource allocation (TDRA), periodicity, and a number of repetitions. A parameter, PUSCHRepTypeIndicator-ForType1ConfiguredGrant, may indicate whether repetitions are transmitted once in a slot (e.g., a "Type A" repetition) or whether a slot may contain multiple repetitions (e.g., a "Type B" repetition). Cross-slot transmissions may be configured where the SLIV in the CG cross a slot boundary or SLIV and repetitions cross a slot boundary, and the UE is configured to use a time domain duplexing (TDD) pattern including multiple consecutive uplink slots.

For Type A repetitions, with repetitions determined by the parameter RepK, a bit or bitmap may indicate the slot boundaries across which phase coherence is to be maintained. For example, if an uplink transmission is scheduled with 8 repetitions (over 8 slots, since a single repetition is transmitted per slot), there are 7 slot boundaries, and a 7-bit bitmap may be used to indicate whether phase coherence is to be maintained across a slot boundary. By doing so, phase coherence may be decoupled from a TDD pattern. For Type B repetitions, SLIV and the total number of repetitions may determine the total number of slots over which a repetition of uplink channel transmissions lasts. Because the network entity can also calculate the total number of slots a priori, a bitmap may also be used in this example to indicate whether phase coherence is to be maintained across slot boundaries. The bitmap may be included as part of a CG Type 1 setup or configuration, where phase coherence is to be configured using a one-time setup. If finer control is needed, the bitmap may be included in a groupCommonDCI message that carries payloads intended for multiple UEs. Each UE for which the groupCommonDCI message carries information may be associated with an offset marking the beginning of the payload for that UE, and the payload for the specific UE may be the bitmap indicating whether phase coherence is to be maintained across slot boundaries.

As discussed, a Type 2 CG may be an uplink grant (e.g., for a PUSCH) that is activated and deactivated via DCI. Configuration 1004 illustrates information that may be included in a Type 2 CG, which, as illustrated, may be a superset of the information included in a Type 1 CG. The DCI may provide a time domain resource allocation and repetition information. For a PUSCH scheduled by DCI format 0_1, if PUSCHRepTypeIndicator-ForDCIFormat0_1 is set to pusch-RepTypeB, the UE may apply the repetition procedures discussed above. To indicate how slot boundaries to be handled for repetitions, the DCI may include a bit or bitmap identifying whether phase coherence is to be maintained across slot boundaries (e.g., as discussed above with respect to a dynamic grant), or bundling parameters may be specified as part of the CG.

Figure 11:
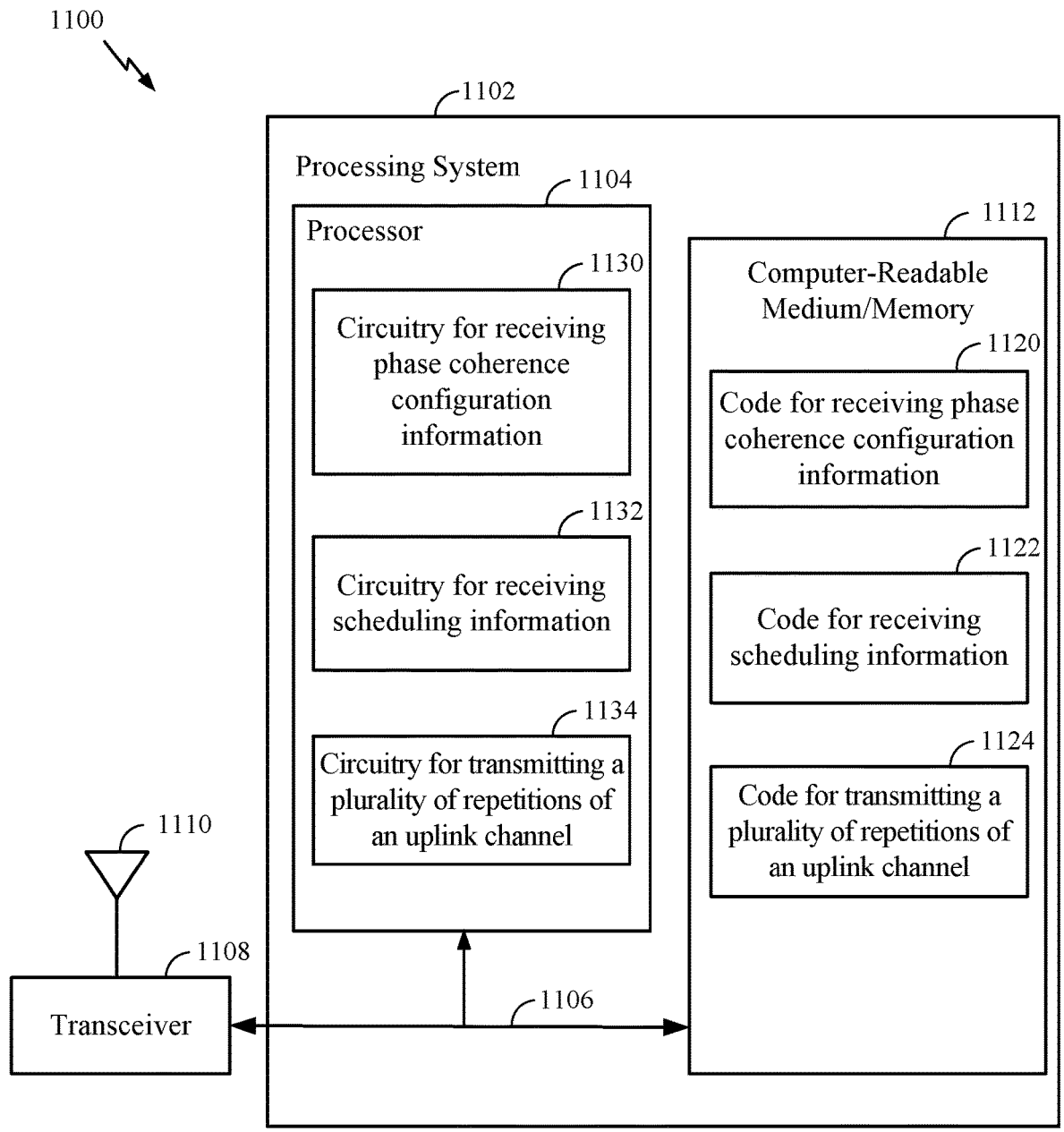
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 5. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 5, or other operations for performing the various techniques discussed herein for maintaining phase coherence across repetitions of an uplink channel transmission. In certain aspects, computer-readable medium/memory 1112 stores code 1120 for receiving phase coherence configuration information; code 1122 for receiving scheduling information; and code 1124 for transmitting a plurality of repetitions of an uplink channel. In certain aspects, the processor 1104 has circuitry configured to implement the code stored in the computer-readable medium/memory 1112. The processor 1104 includes circuitry 1130 for receiving phase coherence configuration information; circuitry 1132 for receiving scheduling information; and circuitry 1134 for transmitting a plurality of repetitions of an uplink channel.

Figure 12:
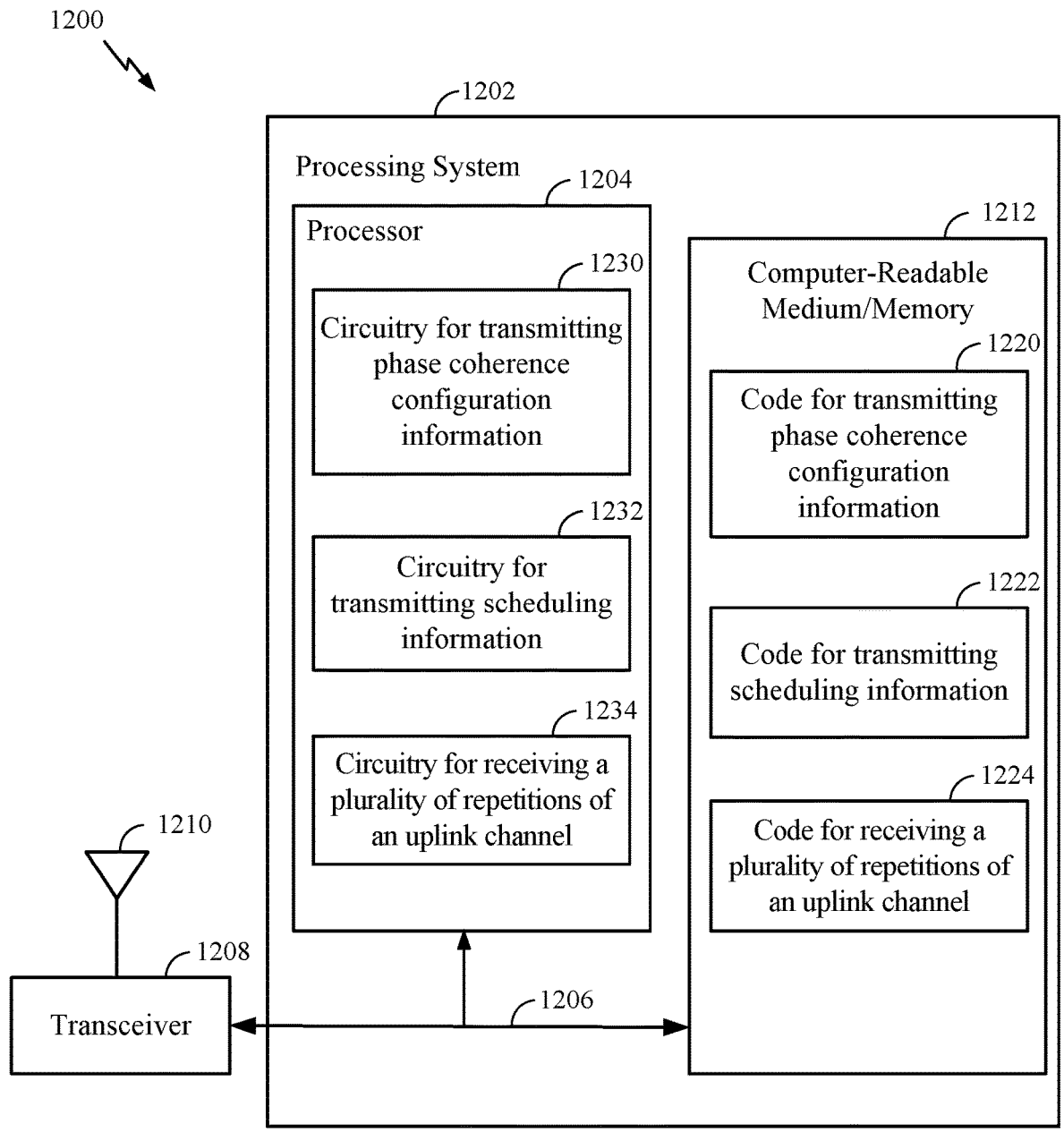
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, or other operations for performing the various techniques discussed herein for maintaining phase coherence across repetitions of an uplink channel transmission. In certain aspects, computer-readable medium/memory 1212 stores code 1220 for receiving phase coherence configuration information; code 1222 for receiving scheduling information; and code 1224 for transmitting a plurality of repetitions of an uplink channel. In certain aspects, the processor 1204 has circuitry configured to implement the code stored in the computer-readable medium/memory 1212. The processor 1204 includes circuitry 1230 for receiving phase coherence configuration information; circuitry 1232 for receiving scheduling information; and circuitry 1234 for transmitting a plurality of repetitions of an uplink channel.

Example Clauses

Clause 1: A method for wireless communications by a user equipment (UE), comprising: receiving, from a network entity, phase coherence configuration information indicating that the UE is to maintain phase coherence for repetitions of uplink channel transmissions that cross slot boundaries; receiving scheduling information scheduling a plurality of repetitions of an uplink channel transmission; and transmitting the plurality of repetitions of the uplink channel transmission based on the scheduling information indicating that the scheduled plurality of repetitions of the uplink channel transmission will cross one or more slot boundaries and the phase coherence configuration information.

Clause 2: The method of Clause 1, wherein the phase coherence configuration information is received in one of downlink control information (DCI) signaling, a medium access control (MAC) control element (CE), or radio resource control (RRC) signaling.

Clause 3: The method of any of Clauses 1 or 2, wherein: receiving the scheduling information comprises receiving a time domain resource allocation (TDRA) identifying a starting symbol for the plurality of repetitions, a symbol length for each repetition of the plurality of repetitions, and a number of repetitions to be transmitted, and the method further comprises determining that the scheduled plurality of repetitions will cross one or more slot boundaries, including: calculating a total number of symbols for the plurality of repetitions based on the symbol length for each repetition and the number of repetitions, and determining, based on the starting symbol and the calculated total number of symbols for the plurality of repetitions, a total number of slots spanned by the scheduled plurality of repetitions and that the scheduled plurality of repetitions crosses at least one slot boundary.

Clause 4: The method of any of Clauses 1 through 3, wherein the scheduling information comprises a dynamic grant of resources for the uplink channel transmission.

Clause 5: The method of Clause 4, wherein the dynamic grant includes an explicit indication that one or more of the scheduled plurality of repetitions are transmitted across slot boundaries without truncation.

Clause 6: The method of any of Clauses 4 or 5, wherein the dynamic grant of resources includes a bitmap, each bit of the bitmap being associated with a respective slot boundary of the one or more slot boundaries that the plurality of repetitions cross and indicating whether phase coherence is to be maintained across the respective slot boundary.

Clause 7: The method of Clause 6, wherein transmitting the plurality of repetitions of the uplink channel transmission comprises maintaining phase coherence across slot boundaries for each slot boundary associated with a bit in the bitmap indicating that phase coherence is to be maintained and not maintaining phase coherence across slot boundaries for one or more of the slot boundaries associated with bits in the bitmap indicating that phase coherence need not be maintained.

Clause 8: The method of any of Clauses 4 through 7, wherein the dynamic grant of resources includes a bitmap, each bit of the bitmap being associated with a respective slot of one or more slots over which the plurality of repetitions are to be transmitted and indicating whether the UE is allowed to take one or more actions to break phase coherence at an end of the respective slot.

Clause 9: The method of any of Clauses 4 through 8, wherein the dynamic grant of resources includes an indication that phase coherence is to be maintained across the one or more slot boundaries.

Clause 10: The method of any of Clauses 1 through 9, wherein the phase coherence configuration information further includes information indicating that the UE is to maintain phase coherence for repetitions of the uplink channel transmission across slot boundaries.

Clause 11: The method of any of Clauses 1 through 10, wherein the scheduling information includes an indication that phase coherence is maintained across repetitions within a slot such that phase coherence is maintained within a slot over which a plurality of the repetitions are transmitted.

Clause 12: The method of any of Clauses 1 through 11, further comprising: indicating, to the network entity, a maximum number of slots over which phase coherence may be maintained.

Clause 13: The method of Clause 12, wherein transmitting the plurality of repetitions of the uplink channel transmission comprises: maintaining phase coherence for transmitting repetitions of the uplink channel transmission over the maximum number of slots; and for repetitions after the maximum number of slots, truncating a number of symbols in a repetition such that the repetition ends at a slot boundary.

Clause 14: The method of any one of Clauses 12 or 13, wherein transmitting the plurality of repetitions of the uplink channel transmission comprises: maintaining phase coherence for transmitting a first plurality of the repetitions of the uplink channel transmission over the maximum number of slots; resetting a phase coherence slot counter; and maintaining phase coherence for transmitting a second plurality of the repetitions of the uplink channel transmission over the maximum number of slots.

Clause 15: The method of any one of Clauses 1 through 14, wherein the scheduling information includes a bitmap, each bit of the bitmap being associated with a respective slot boundary of the one or more slot boundaries that the plurality of repetitions cross and indicating whether phase coherence is to be maintained across the respective slot boundary.

Clause 16: The method of Clause 15, wherein the phase coherence configuration information and scheduling information are received in a configured grant setup message.

Clause 17: The method of any one of Clauses 15 or 16, wherein the scheduling information is received in downlink control information (DCI) signaling, and the bitmap is received in DCI signaling scheduling the plurality of repetitions of the uplink channel transmission.

Clause 18: The method of any one of Clauses 1 through 17, wherein the scheduling information includes a bitmap, each bit of the bitmap being associated with a respective slot of one or more slots over which the plurality of repetitions are to be transmitted and indicating whether the UE is allowed to take one or more actions to break phase coherence at an end of the respective slot.

Clause 19: The method of any one of Clauses 1 through 18, wherein the scheduling information includes an indication that phase coherence is to be maintained across the one or more slot boundaries.

Clause 20: A method for wireless communications by a network entity, comprising: transmitting, to a user equipment (UE), phase coherence configuration information indicating that the UE is to maintain phase coherence for repetitions of uplink channel transmissions that cross slot boundaries; transmitting, to the UE, scheduling information scheduling a plurality of repetitions of an uplink channel transmission; and receiving the plurality of repetitions of the uplink channel transmission based on the scheduling information and the phase coherence configuration information.

Clause 21: The method of Clause 20, wherein the phase coherence configuration information is transmitted in one of downlink control information (DCI) signaling, a medium access control (MAC) control element (CE), or radio resource control (RRC) signaling.

Clause 22: The method of any of Clauses 20 or 21, wherein: transmitting the scheduling information comprises transmitting a time domain resource allocation (TDRA) identifying a starting symbol for the plurality of repetitions, a symbol length for each repetition of the plurality of repetitions, and a number of repetitions to be transmitted.

Clause 23: The method of any of Clauses 20 through 22, wherein the scheduling information the scheduling information comprises a dynamic grant of resources for the uplink channel transmission.

Clause 24: The method of Clause 23, wherein the dynamic grant includes an explicit indication that one or more of the scheduled plurality of repetitions are to be transmitted across slot boundaries without truncation.

Clause 25: The method of any of Clauses 23 or 24, wherein the dynamic grant of resources includes a bitmap, each bit of the bitmap being associated with a respective slot boundary of the one of more slot boundaries that the plurality of repetitions cross and indicating whether phase coherence is to be maintained across the respective slot boundary.

Clause 26: The method of Clause 25, wherein receiving the plurality of repetitions of the uplink channel transmission comprises receiving one or more repetitions transmitted by maintaining phase coherence across s slot boundaries for each slot boundary associated with a bit in the bitmap indicating that phase coherence is to be maintained and receiving repetitions transmitted by not maintaining phase coherence across slot boundaries for one or more of the slot boundaries associated with bits in the bitmap indicating that phase coherence need not be maintained.

Clause 27: The method of any of Clauses 23 through 26, wherein the dynamic grant of resources includes a bitmap, each bit of the bitmap being associated with respective slot of one or more slots over which the plurality of repetitions are to be transmitted and indicating whether the UE is allowed to take one or more actions to break phase coherence at an end of the respective slot.

Clause 28: The method of any of Clauses 23 through 27, wherein the dynamic grant of resources includes an indication that phase coherence is to be maintained across the one or more slot boundaries.

Clause 29: The method of any of Clauses 20 through 28, wherein the phase coherence configuration information further includes information indicating that the UE is to maintain phase coherence for repetitions of the uplink channel transmission across slot boundaries.

Clause 30: The method of any of Clauses 20 through 29, wherein the scheduling information includes an indication that phase coherence is to be maintained across repetitions within a slot such that phase coherence is maintained within a slot over which a plurality of the repetitions are transmitted.

Clause 31: The method of any of Clauses 20 through 30, further comprising: receiving, from the UE, an indication of a maximum number of slots over which phase coherence may be maintained.

Clause 32: The method of Clause 31, wherein receiving the plurality of repetitions of the uplink channel transmission comprises: receiving repetitions of the uplink channel over the maximum number of slots, wherein the received repetitions are transmitted while maintaining phase coherence; and for repetitions after the maximum number of slots, receiving a repetition having a truncated number of symbols such that the repetition ends at a slot boundary.

Clause 33: The method of any of Clauses 31 or 32, wherein receiving the plurality of repetitions of the uplink channel comprises: receiving a first plurality of repetitions of the uplink channel over the maximum number of slots, wherein the received first plurality of repetitions are transmitted while maintaining phase coherence; and receiving a second plurality of repetitions over the maximum number of slots, wherein the received second plurality of repetitions are transmitted while maintaining phase coherence using different parameters from the first plurality of repetitions.

Clause 34: The method of any of Clauses 20 through 33, wherein the scheduling information includes a bitmap, each bit of the bitmap being associated with a respective slot boundary of the one or more slot boundaries that the plurality of repetitions cross and indicating whether phase coherence is to be maintained across the respective slot boundary.

Clause 35: The method of Clause 34, wherein the phase coherence configuration information and scheduling information are received in a configured grant setup message.

Clause 36: The method of any of Clauses 34 or 35, wherein the scheduling information is received in downlink control information (DCI) signaling, and the bitmap is received in DCI signaling scheduling the plurality of repetitions of the uplink channel transmission.

Clause 37: The method of any of Clauses 20 through 36, wherein the scheduling information includes a bitmap, each bit of the bitmap being associated with a respective slot of one or more slots over which the plurality of repetitions are to be transmitted and indicating whether the UE is allowed to take one or more actions to break phase coherence at an end of the respective slot.

Clause 38: The method of any of Clauses 20 through 37, wherein the scheduling information includes an indication that phase coherence is to be maintained across the one or more slot boundaries.

Clause 39: An apparatus, comprising: a memory having executable instructions stored thereon; and a processor configured to execute the executable instructions to cause the apparatus to perform the operations of any of Clauses 1 through 38.

Clause 40: An apparatus, comprising: means for performing the operations of any of Clauses 1 through 38.

Clause 41: A computer-readable medium having executable instructions stored thereon which, when executed, causes a processor to perform the operations of any of Clauses 1 through 38.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus for wireless communications by a user equipment (UE), comprising:
   a memory having executable instructions stored thereon; and
   a processor configured to execute the executable instructions to cause the apparatus to:
      receive, from a network entity, phase coherence configuration information indicating that the UE is to maintain phase coherence for repetitions of uplink channel transmissions that cross slot boundaries;
      receive scheduling information scheduling a plurality of repetitions of an uplink channel transmission; and
      transmit the plurality of repetitions of the uplink channel transmission based on the scheduling information indicating that the scheduled plurality of repetitions of the uplink channel transmission will cross one or more slot boundaries and the phase coherence configuration information.

2. The apparatus of claim 1, wherein the phase coherence configuration information is received in one of downlink control information (DCI) signaling, a medium access control (MAC) control element (CE), or radio resource control (RRC) signaling.

3. The apparatus of claim 1, wherein:
   the executable instructions that cause the apparatus to receive the scheduling information configure the processor to cause the apparatus to receive a time domain resource allocation (TDRA) identifying a starting symbol for the plurality of repetitions, a symbol length for each repetition of the plurality of repetitions, and a number of repetitions to be transmitted, and
   the processor is further configured to determine that the scheduled plurality of repetitions will cross one or more slot boundaries, wherein the executable instructions that cause the apparatus to determine that the scheduled plurality of repetitions will cross one or more slot boundaries configure the processor to cause the apparatus to:
      calculate a total number of symbols for the plurality of repetitions based on the symbol length for each repetition and the number of repetitions, and
      determine, based on the starting symbol and the calculated total number of symbols for the plurality of repetitions, a total number of slots spanned by the scheduled plurality of repetitions and that the scheduled plurality of repetitions crosses at least one slot boundary.

4. The apparatus of claim 1, wherein the scheduling information comprises a dynamic grant of resources for the uplink channel transmission.

5. The apparatus of claim 4, wherein the dynamic grant of resources includes one or more of:
   an explicit indication that one or more of the scheduled plurality of repetitions are transmitted across slot boundaries without truncation,
   includes a bitmap, each bit of the bitmap being associated with a respective slot boundary of the one or more slot boundaries that the plurality of repetitions cross and indicating whether phase coherence is to be maintained across the respective slot boundary,
   a bitmap, each bit of the bitmap being associated with a respective slot of one or more slots over which the plurality of repetitions are to be transmitted and indicating whether the UE is allowed to take one or more actions to break phase coherence at an end of the respective slot, or
   an indication that phase coherence is to be maintained across the one or more slot boundaries.

6. The apparatus of claim 5, wherein the executable instructions that cause the apparatus to transmit the plurality of repetitions of the uplink channel transmission configure the processor to cause the apparatus to maintain phase coherence across slot boundaries for each slot boundary associated with a bit in the bitmap indicating that phase coherence is to be maintained and not maintain phase coherence across slot boundaries for one or more of the slot boundaries associated with bits in the bitmap indicating that phase coherence need not be maintained.

7. The apparatus of claim 1, wherein the phase coherence configuration information further includes information indicating that the UE is to maintain phase coherence for repetitions of the uplink channel transmission across slot boundaries.

8. The apparatus of claim 1, wherein the scheduling information includes an indication that phase coherence is maintained across repetitions within a slot such that phase coherence is maintained within a slot over which a plurality of the repetitions are transmitted.

9. The apparatus of claim 1, wherein the processor is further configured to indicate, to the network entity, a maximum number of slots over which phase coherence may be maintained.

10. The apparatus of claim 9, wherein the executable instructions that cause the apparatus to transmit the plurality of repetitions of the uplink channel transmission configure the processor to cause the apparatus to to maintain phase coherence for transmitting repetitions of the uplink channel transmission over the maximum number of slots.

11. The apparatus of claim 10, wherein the executable instructions that cause the apparatus to transmit the plurality of repetitions of the uplink channel transmission configure the processor to cause the apparatus to truncate, for repetitions after the maximum number of slots, a number of symbols in a repetition such that the repetition ends at a slot boundary.

12. The apparatus of claim 9, wherein the executable instructions that cause the apparatus to transmit the plurality of repetitions of the uplink channel transmission configure the processor to cause the apparatus to:

maintain phase coherence for transmitting a first plurality of the repetitions of the uplink channel transmission over the maximum number of slots;
reset a phase coherence slot counter; and
maintain phase coherence for transmitting a second plurality of the repetitions of the uplink channel transmission over the maximum number of slots.

13. The apparatus of claim 1, wherein the scheduling information includes a bitmap, each bit of the bitmap being associated with a respective slot boundary of the one or more slot boundaries that the plurality of repetitions cross and indicating whether phase coherence is to be maintained across the respective slot boundary.

14. The apparatus of claim 13, wherein the phase coherence configuration information and scheduling information are received in a configured grant setup message.

15. The apparatus of claim 14, wherein the scheduling information is received in downlink control information (DCI) signaling, and the bitmap is received in DCI signaling scheduling the plurality of repetitions of the uplink channel transmission.

16. The apparatus of claim 1, wherein the scheduling information includes a bitmap, each bit of the bitmap being associated with a respective slot of one or more slots over which the plurality of repetitions are to be transmitted and indicating whether the UE is allowed to take one or more actions to break phase coherence at an end of the respective slot.

17. The apparatus of claim 1, wherein the scheduling information includes an indication that phase coherence is to be maintained across the one or more slot boundaries.

18. An apparatus for wireless communications by a network entity, comprising:
a memory having executable instructions stored thereon; and
a processor configured to execute the executable instructions to cause to apparatus to:
transmit, to a user equipment (UE), phase coherence configuration information indicating that the UE is to maintain phase coherence for repetitions of uplink channel transmissions that cross slot boundaries;
transmit, to the UE, scheduling information scheduling a plurality of repetitions of an uplink channel transmission; and
receive the plurality of repetitions of the uplink channel transmission based on the scheduling information and the phase coherence configuration information.

19. The apparatus of claim 18, wherein the phase coherence configuration information is transmitted in one of downlink control information (DCI) signaling, a medium access control (MAC) control element (CE), or radio resource control (RRC) signaling.

20. The apparatus of claim 18, wherein the executable instructions that cause the apparatus to transmit the scheduling information configure the processor to cause the apparatus to transmit a time domain resource allocation (TDRA) identifying a starting symbol for the plurality of repetitions, a symbol length for each repetition of the plurality of repetitions, and a number of repetitions to be transmitted.

21. The apparatus of claim 18, wherein the scheduling information the scheduling information comprises a dynamic grant of resources for the uplink channel transmission.

22. The apparatus of claim 18, wherein the phase coherence configuration information further includes information indicating that the UE is to maintain phase coherence for repetitions of the uplink channel transmission across slot boundaries.

23. The apparatus of claim 18, wherein the scheduling information includes an indication that phase coherence is to be maintained across repetitions within a slot such that phase coherence is maintained within a slot over which a plurality of the repetitions are transmitted.

24. The apparatus of claim 18, wherein the processor is further configured to receive, from the UE, an indication of a maximum number of slots over which phase coherence may be maintained.

25. The apparatus of claim 24, wherein the executable instructions that cause the apparatus to receive the plurality of repetitions of the uplink channel transmission configure the processor to cause the apparatus to:
receive repetitions of the uplink channel over the maximum number of slots, wherein the received repetitions are transmitted while maintaining phase coherence; and
for repetitions after the maximum number of slots, receive a repetition having a truncated number of symbols such that the repetition ends at a slot boundary.

26. The apparatus of claim 24, wherein the executable instructions that cause the apparatus to receive the plurality of repetitions of the uplink channel transmission configure the processor to cause the apparatus to:
receive a first plurality of repetitions of the uplink channel over the maximum number of slots, wherein the received first plurality of repetitions are transmitted while maintaining phase coherence; and
receive a second plurality of repetitions over the maximum number of slots, wherein the received second plurality of repetitions are transmitted while maintaining phase coherence using different parameters from the first plurality of repetitions.

27. The apparatus of claim 18, wherein the scheduling information includes a bitmap, each bit of the bitmap being associated with a respective slot boundary of the one or more slot boundaries that the plurality of repetitions cross and indicating whether phase coherence is to be maintained across the respective slot boundary.

28. The apparatus of claim 18, wherein the scheduling information includes a bitmap, each bit of the bitmap being associated with a respective slot of one or more slots over which the plurality of repetitions are to be transmitted and indicating whether the UE is allowed to take one or more actions to break phase coherence at an end of the respective slot.

29. A method for wireless communications by a user equipment (UE), comprising:
receiving, from a network entity, phase coherence configuration information indicating that the UE is to maintain phase coherence for repetitions of uplink channel transmissions that cross slot boundaries;
receiving scheduling information scheduling a plurality of repetitions of an uplink channel transmission; and
transmitting the plurality of repetitions of the uplink channel transmission based on the scheduling information indicating that the scheduled plurality of repetitions of the uplink channel transmission will cross one or more slot boundaries and the phase coherence configuration information.

30. A method for wireless communications by a network entity, comprising:
transmitting, to a user equipment (UE), phase coherence configuration information indicating that the UE is to maintain phase coherence for repetitions of uplink channel transmissions that cross slot boundaries;

transmitting, to the UE, scheduling information scheduling a plurality of repetitions of an uplink channel transmission; and receiving the plurality of repetitions of the uplink channel transmission based on the scheduling information and the phase coherence configuration information.

* * * * *